United States Patent
Neadle et al.

(10) Patent No.: US 6,234,629 B1
(45) Date of Patent: May 22, 2001

(54) DIFFERENTIAL THICKNESS CONTACT LENS WITH COMPENSATION FOR DIFFERENTIAL SHRINKAGE AND METHOD OF MANUFACTURING SAME

(75) Inventors: Susan Neadle; Timothy Clutterbuck, both of Jacksonville, FL (US)

(73) Assignee: JOhnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/217,727

(22) Filed: Dec. 21, 1998

(51) Int. Cl.[7] .............................. G02C 7/02; B29D 11/00
(52) U.S. Cl. .............................................. 351/177; 264/2.2
(58) Field of Search ............................ 351/177, 160 R, 351/160 H, 161, 162, 176; 264/2.2

(56) References Cited

U.S. PATENT DOCUMENTS

| | | | | |
|---|---|---|---|---|
| 3,248,460 | * | 4/1966 | Naujokas | 264/1.7 |
| 4,153,349 | | 5/1979 | Wichterle | 351/160 H |
| 4,208,364 | | 6/1980 | Shepherd | 264/2.2 |
| 4,565,348 | * | 1/1986 | Larsen | 249/122 |
| 4,573,774 | | 3/1986 | Sitterle | 351/160 H |
| 4,573,903 | | 3/1986 | Boudet et al. | 425/555 |
| 5,219,497 | * | 6/1993 | Blum | 264/1.4 |
| 5,366,668 | * | 11/1994 | Cuthbertson et al. | 264/1.8 |
| 5,466,147 | * | 11/1995 | Appleton et al. | 425/412 |
| 5,650,837 | | 7/1997 | Roffman et al. | 351/161 |
| 5,652,638 | | 7/1997 | Roffman et al. | 351/161 |
| 5,962,548 | * | 10/1999 | Vanderlaan et al. | 523/107 |
| 5,988,813 | * | 11/1999 | Neadle et al. | 351/177 |

FOREIGN PATENT DOCUMENTS

| | | |
|---|---|---|
| 0 051 027 | 5/1982 | (EP) . |
| 0 561 481 | 9/1993 | (EP) . |

\* cited by examiner

*Primary Examiner*—Georgia Epps
*Assistant Examiner*—Jordan M. Schwartz

(57) ABSTRACT

A contact lens and a method of manufacturing a contact lens having areas of different thickness, the contact lens being compensated for differential shrinkage during the manufacturing process. The unwanted toricity induced by the differential shrinkage caused by a particular manufacturing process is experimentally determined, both in terms of angular position and power. The lens compensation is achieved by providing an equal and opposite power to the unwanted toricity induced by the manufacturing process.

10 Claims, 2 Drawing Sheets

DIFFERENTIAL THICKNESS CONTACT LENS WITH COMPENSATION FOR DIFFERENTIAL SHRINKAGE AND METHOD OF MANUFACTURING SAME

FIELD OF THE INVENTION

The present invention relates to a differential thickness contact lens which is compensated for differential shrinkage, as well as a method of manufacturing such lens.

BACKGROUND OF THE INVENTION

Contact lenses are generally used to correct various types of vision problems. See, for example, U.S. Pat. Nos. 4,573,774; 5,650,837; and 5,652,638, which are incorporated herein in their entireties by reference. Also, various texts discuss the principles of contact lens design and manufacturing: Ruben et al., Contact Lens Practice (Chapman & Hall, London); Stein, Slatt & Stein, Opthalmic Terminology (C.V. Mosby Company, St. Louis, 1987), which are also incorporated herein by reference.

Astigmatism occurs when a portion of the eye focuses light at a different focal point than the rest of the eye, i.e., it is a refractive error of the eye in which the rays of light do not come to a single point focus on the retina. Toric lenses, or lenses with cylinder power typically are used to correct for astigmatism. For toric lenses, the cylinder power is along the cylinder radius, which is orthogonal to the cylinder axis. The cylinder power of the toric lens results in the eye focusing light rays at a common focal point.

As indicated above, toricity is used to correct astigmatism so that it focuses light rays at a common point. However, the common focal point may be located at an incorrect position with respect to the retina. This condition is referred to as either "myopia" or "hyperopia". Myopia typically results from a steep cornea that causes light rays to focus at a focal point that is short of the retina. Conversely, hyperopia is a case in which a flat cornea causes light rays to focus at a focal point that is behind the retina. Sphere power is included in a lens to cause light to properly focus on the retina.

Contact lenses may include either or both spherical correction or cylinder correction depending on the particular circumstances of the lens user's eyes. Lenses that have only spherical correction are spherically symmetric and, thus, any rotation of the contact lens inside the eye is irrelevant and does not disturb the intended vision correction. Toric contact lenses, or other rotationally stabilized lenses, on the other hand are typically designed to include areas of different thickness, resulting in a spherically asymmetric lens. As a result, toric contact lenses need to be rotationally stabilized on the eye to insure that the lens is properly oriented with respect to the eye in order to carry out its function of correcting the vision of particular areas of the eye. Additionally, lenses may also need to be stabilized in the eye for comfort reasons.

Rotational stability may be achieved using a number of designs including inferior truncation, double truncation, thin zones (also called "double slab-off"), back surface toricity and prism wedge profile. These rotation stabilizing designs may be used individually or in combination. One common feature of these rotation stabilizing designs is the use of different thickness areas in the lens to achieve rotational stability. For example, in the case of a "slab off" design, the top and bottom portions of the lens orient beneath the eyelids. At the same time, the thicker portions of the lens are positioned in between the eyelids.

The process for manufacturing differential thickness lenses typically includes a curing step, which may involve UV, heat, or other similar curing process. However, as a result of the curing step, the material of the lens shrinks at different rates due to the differential thicknesses. This differential shrinkage results in an induced, undesired toricity in the lens.

SUMMARY OF THE INVENTION

The present invention is for a differential thickness contact lens which is compensated for differential shrinkage during the manufacturing process. The present invention is also for a method of manufacturing and compensating a differential thickness lens for differential shrinkage during the manufacturing process. The unwanted toricity induced by the differential shrinkage caused by a particular manufacturing process is experimentally determined, both in terms of angular position and power. The lens compensation is achieved by providing an equal and opposite power to the unwanted toricity induced by the manufacturing process. The lens compensation may be used in conjunction with intended toricity, i.e., the lens compensation is used to provide a baseline lens, which is then designed to include a particular, desired toricity. The lens compensation is implemented by adjusting the lens geometry so that upon curing, the lens corresponds to the desired, prescribed lens, without any unwanted toricity.

The present invention is for a method of producing a compensated contact lens, and also a compensated contact lens, which is produced using the following steps:

designing a lens to have first and second areas of different thickness;

determining any differential shrinkage which will occur during the curing of the lens having first and second areas of different thickness; and modifying the lens to include geometrical features to compensate for the differential shrinkage.

DETAILED DESCRIPTION OF THE INVENTION

Figure 1:
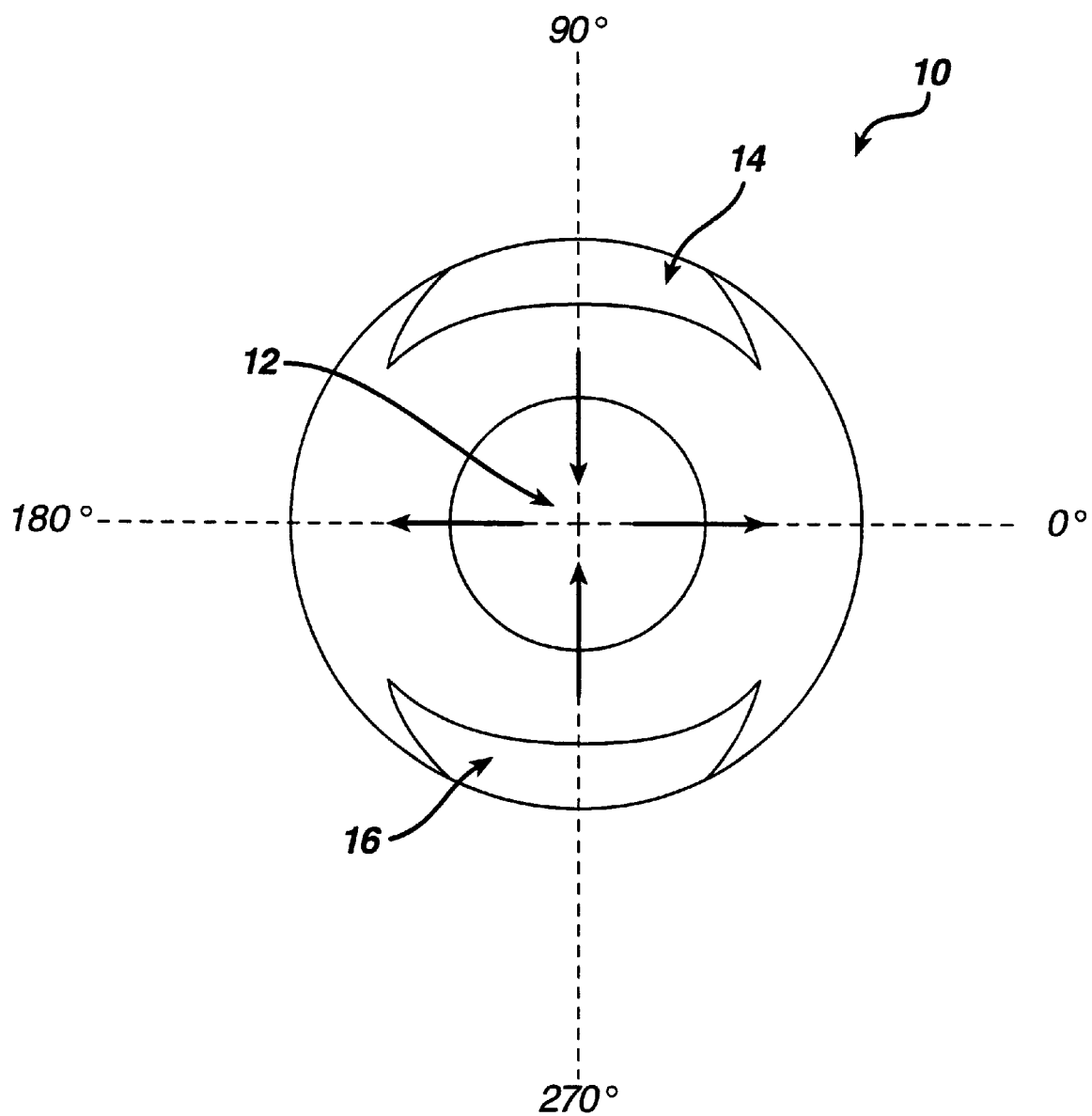
FIG. 1 is an illustration of a toric contact lens.

Referring to the drawings in detail, FIG. 1 illustrates a plan view of the front surface of a contact lens 10 having a rotationally stable design. The lens 10 includes a central optical zone 12, as well as thinned out areas 14 and 16 located at the upper and bottom regions, respectively, and intended to be positioned under the patient's eyelids.

It has been observed that a lens having areas of different thickness changes its geometry during the curing step in the manufacturing process. Curing brings about a differential shrinkage that has the effect of inducing a cylinder power, or toricity, on the lens in addition to any intended power correction placed into the lens. One method of addressing the problem is to use multiple base curve designs. However, for efficiency in production, it is desirable to minimize base curve designs.

To demonstrate the observed problem, a control lens was designed to have only the central optical zone 12 and no thinned out areas, such as 14 and 16. Concurrently, a lens was also designed in accordance with FIG. 1, including the optical zone 12. as well as thinned out areas 14 and 16. Both lenses were cured and then measured optically. The control lens was found to have no induced toricity. In contrast, the lens of FIG. 1 was found to have an induced toricity of −0.10 diopters, with the power correction along the 180 degree horizontal meridian of the lens (cylinder radius of 180 degrees, cylinder axis of 90 degrees).

The induced toricity is believed to be a result of material movement along the arrows indicated in FIG. 1. Specifically, material flows inward along the 90 and 270 degree axes, while material flows outward along the 0 and 180 degree axes. The effect of this material migration is shown in FIG. 2*a*, which illustrates in cross section (along the 90–270 degree axis) the lens of FIG. 1 with the induced toricity as a result of curing.

Figures 2A, 2B, 2C:
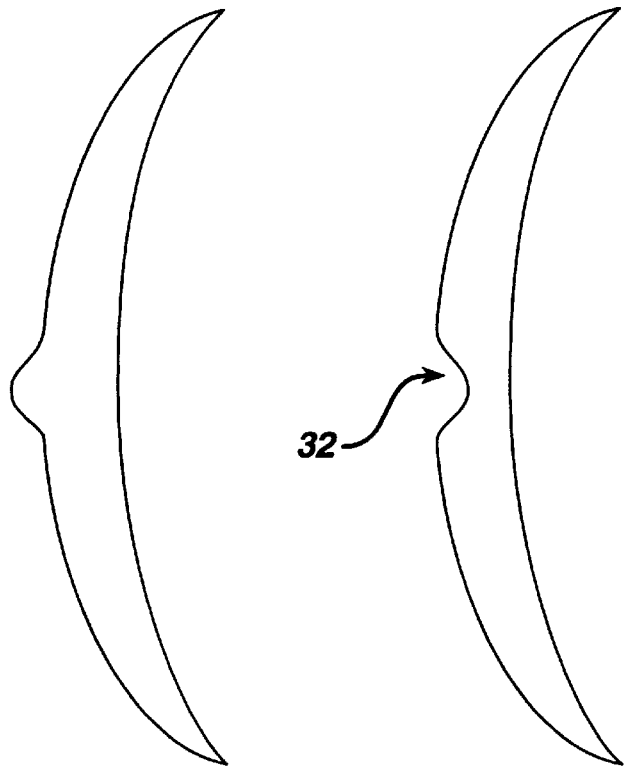
FIG. 2a is a cross sectional illustration along the 90–270 degree axis of a lens with induced toricity.
FIG. 2b is a cross sectional illustration along the 90–270 degree axis of a compensated lens prior to curing in accordance with the present invention.
FIG. 2c is a cross sectional illustration along the 90–270 degree axis of a compensated lens prior to curing in accordance with the present invention.

It has been discovered that the lens with the induced toricity may be corrected or compensated by modifying the surface geometry of either FIG. 2*b* or FIG. 2*c* prior to curing. FIG. 2*b* illustrates in cross section (along the 90–270 degree axis) a lens geometry prior to curing designed to have an indentation or flatter section 32 on the front surface of the lens and positioned to correspond to the induced toricity of the lens of FIG. 2*a*. In contrast, FIG. 2*c* illustrates in cross section (along the 90–270 degree axis) a lens geometry prior to curing having a ridge or steeper section 42 on the back surface of the lens and positioned to correspond to the induced toricity of the lens of FIG. 2*a*. Essentially, the geometries of FIGS. 2*b* and 2*c* are complementary compensation schemes due to the fact that the front surface and back surface of the lens interact with each other such that they behave in opposite manners. This phenomenon is best illustrated by way of example to a curved plate which is covered by a stretchy material. As the material is stretched along the front surface of the plate, the material is made taut or thin, while on the back surface, the material exhibits slack or is thicker. This is because the material of the front surface is connected to the material of the back surface. Thus, for the back surface of the lens of FIG. 1, material will flow in the opposite directions, or outward along the 90 and 270 degree axes, and material will flow inward along the 0 and 180 degree axes.

In the case of the lens of FIG. 2*b*, upon curing, material will flow on the front surface according to the arrows in FIG. 1 to fill in the indentation 32 to provide a smooth front surface. Conversely, in the case of the lens of FIG. 2*c*, upon curing, the material of ridge 42 on the back surface will flow in directions opposite to the arrows in FIG. 1 to result in a smooth surface lens without any induced toricity.

The specific embodiment discussed above illustrates the general principle according to the present invention of characterizing the induced toricity as a result of a particular lens design. The induced toricity (angle and power) is then compensated for by introducing geometrical features into the lens prior to curing that are equal and opposite to the induced toricity.

The present invention may be utilized in the production of soft or hard contact lenses, but preferably is used in the production of soft contact lenses. More preferably, the invention is used in the production of hydrogel lenses or silicone-containing hydrogel lenses. Many variations of the present invention will suggest themselves to those skilled in the art in light of the above, detailed description. All such variations are within the scope of the invention as set forth in the appended claims.

What is claimed is:

1. A method of producing a contact lens which is compensated for differential shrinkage, comprising the following steps:

designing a lens to have a first area of a first thickness and a second area of a second thickness, said first and second thicknesses being different;

determining a power and angular position of induced toricity which is caused by differential shrinkage occurring during the curing of said lens;

modifying said lens prior to curing to include a substantially equal and opposite toricity to the induced toricity; and curing said modified lens.

2. The method of claim 1, wherein the modifying step includes the step of modifying a front surface of said lens.

3. The method of claim 1, wherein the modifying step includes the step of modifying a back surface of said lens.

4. The method of claim 1, wherein said lens is a hydrogel lens.

5. The method of claim 1, wherein said lens is a silicone-containing hydrogel lens.

6. The method of claim 1, wherein said lens is a toric lens.

7. The method of claim 6 wherein said lens is a hydrogel lens.

8. The method of claim 6 wherein said lens is a silicone-containing hydrogel lens.

9. A contact lens produced in accordance with the method of claim 6.

10. A contact lens produced in accordance with the method of claim 1.

\* \* \* \* \*